US012720546B2

(12) United States Patent
Fu

(10) Patent No.: US 12,720,546 B2
(45) Date of Patent: Aug. 25, 2026

(54) METHOD AND APPARATUS FOR TRANSMITTING SCHEDULING INTERVAL INFORMATION, AND READABLE STORAGE MEDIUM

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 379 days.

(21) Appl. No.: 18/551,758

(22) PCT Filed: Mar. 31, 2021

(86) PCT No.: PCT/CN2021/084520
§ 371 (c)(1),
(2) Date: Sep. 21, 2023

(87) PCT Pub. No.: WO2022/205123
PCT Pub. Date: Oct. 6, 2022

(65) Prior Publication Data
US 2024/0172232 A1 May 23, 2024

(51) Int. Cl.
*H04W 72/1273* (2023.01)
*H04L 27/26* (2006.01)
*H04W 72/232* (2023.01)

(52) U.S. Cl.
CPC ... *H04W 72/1273* (2013.01); *H04L 27/26025* (2021.01); *H04W 72/232* (2023.01)

(58) Field of Classification Search
CPC ............ H04W 72/1273; H04W 72/232; H04L 27/26025
See application file for complete search history.

(56) References Cited

U.S. PATENT DOCUMENTS

| | | | | |
|---|---|---|---|---|
| 2018/0279360 | A1* | 9/2018 | Park | H04W 72/23 |
| 2019/0274032 | A1 | 9/2019 | Chatterjee et al. | |
| 2019/0363832 | A1* | 11/2019 | Yang | H04W 72/0446 |
| 2020/0351925 | A1* | 11/2020 | Bagheri | H04W 52/0229 |
| 2021/0084622 | A1* | 3/2021 | Choi | H04L 1/08 |
| 2021/0092760 | A1* | 3/2021 | Nam | H04L 5/0092 |
| 2021/0105716 | A1* | 4/2021 | Wu | H04L 41/0806 |
| 2021/0321442 | A1* | 10/2021 | Jung | H04L 5/0053 |

(Continued)

FOREIGN PATENT DOCUMENTS

| | | | |
|---|---|---|---|
| WO | WO 2021015498 | A1 | 1/2021 |
| WO | 2021034656 | A1 | 2/2021 |

OTHER PUBLICATIONS

Extended European Search Report issued in Application No. 21933791.2 dated Mar. 15, 2024, 10 pages.

(Continued)

*Primary Examiner* — Jael M Ulysse
(74) *Attorney, Agent, or Firm* — Finnegan, Henderson, Farabow, Garrett & Dunner, L.L.P.

(57) ABSTRACT

A method for transmitting scheduling interval information is performed by a network device, and includes: sending a high-layer signaling to a user equipment, wherein the high-layer signaling includes information indicating a value range of a minimum scheduling interval, and a maximum value of the value range of the minimum scheduling interval is greater than 16.

18 Claims, 3 Drawing Sheets

(56) References Cited

U.S. PATENT DOCUMENTS

| | | | | |
|---|---|---|---|---|
| 2022/0104201 | A1* | 3/2022 | Takeda | H04W 72/20 |
| 2022/0110148 | A1* | 4/2022 | Oh | H04W 72/23 |
| 2022/0150827 | A1 | 5/2022 | Kim et al. | |
| 2022/0217748 | A1* | 7/2022 | Seo | H04L 27/26025 |
| 2022/0312440 | A1* | 9/2022 | Bagheri | H04W 72/044 |
| 2022/0353898 | A1* | 11/2022 | Li | H04L 5/0055 |
| 2022/0369354 | A1* | 11/2022 | Seo | H04L 5/0094 |
| 2022/0377805 | A1* | 11/2022 | Seo | H04L 5/0094 |
| 2023/0180250 | A1* | 6/2023 | Gao | H04L 5/0053 370/329 |
| 2023/0319835 | A1* | 10/2023 | Cheng | H04L 5/0053 370/336 |
| 2024/0292412 | A1* | 8/2024 | Seok | H04W 72/1268 |
| 2025/0097991 | A1* | 3/2025 | Seo | H04L 5/0094 |

OTHER PUBLICATIONS

Ericsson, "PDSCH/PUSCH enhancements," 3GPP TSG-RAN WG1 Meeting #104-e, Tdoc R1-2101310, On-line, Jan. 25-Feb. 5, 2021, 27 pages.

Qualcomm Incorporated, "Remaining issues on SCell dormancy and cross-carrier scheduling," 3GPP TSG RAN WG1 #104-e, R1-2101443, e-Meeting, Jan. 25-Feb. 5, 2021, 7 pages.

Huawei, HiSilicon, "PDSCH/PUSCH enhancements for 52-71GHz band", 3GPP TSG RAN WG1 Meeting #104-e, R1-2100201, E-meeting, Jan. 25-Feb. 5, 2021, 16 pages.

International Search Report and Written Opinion of International Application No. PCT/CN2021/084520, mailed Aug. 27, 2021, 13 pages.

The Second Office Action for Chinese Application No. 202180001017.7, dated Dec. 17, 2025, 14 pages.

* cited by examiner

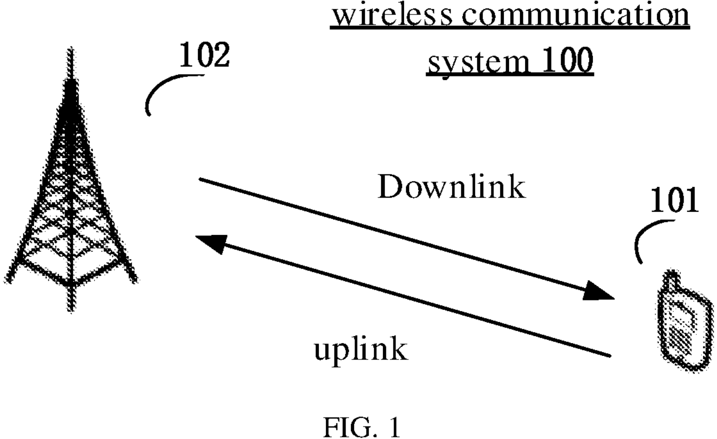

FIG. 1 network device 102 user equipment 101

S21, sending a high-layer signaling to a user equipment, wherein the high-layer signaling comprises information for indicating a value range of a minimum scheduling spacing, and a maximum value of the value range of the minimum scheduling spacing is greater than 16.

S22, receiving a high-layer signaling from a network device, wherein the high-layer signaling comprises information for indicating a value range of a minimum scheduling spacing, and a maximum value of the value range of the minimum scheduling spacing is greater than 16.

FIG. 2

METHOD AND APPARATUS FOR TRANSMITTING SCHEDULING INTERVAL INFORMATION, AND READABLE STORAGE MEDIUM

CROSS-REFERENCE TO RELATED APPLICATIONS

The present application is a National Stage of International Application No. PCT/CN2021/084520, filed on Mar. 31, 2021, the contents of which are incorporated herein by reference.

FIELD

The present disclosure relates to the field of wireless communication technology, and particularly to a method for transmitting scheduling interval information, a device, and a readable storage medium.

BACKGROUND

Currently, in the new radio (NR), downlink data is carried on a physical downlink shared channel (PDSCH), and uplink data is carried on a physical uplink shared channel (PUSCH). A base station device schedules the PDSCH and the PUSCH through downlink control information (DCI) carried on a physical downlink control channel (PDCCH).

To ensure scheduling flexibility, one piece of the DCI may schedule one PDSCH or PUSCH. As a sub-carrier spacing (SCS) increases, a corresponding slot duration decreases. For example, when the SCS is 960 khz, the corresponding slot duration is 1/64 millisecond (ms).

The DCI for downlink-scheduling the PDSCH includes k0, where k0 is configured to indicate a slot interval between the PDCCH where the DCI is located and the PDSCH scheduled by the DCI. The DCI for uplink-scheduling the PUSCH includes k2, where k2 is configured to indicate a slot interval between the PDCCH where the DCI is located and the PUSCH scheduled by the DCI.

In cross-slot scheduling, it is stipulated that the minimum scheduling interval k0_min between the PDCCH and the PDSCH ranges from 0 to 16 (in unit of slots), and that the minimum scheduling interval k2_min between the PDCCH and the PUSCH ranges from 0 to 16. A user equipment may turn off some radio frequency devices, reduce cache and reduce a processing voltage during the minimum scheduling interval, so as to realize energy saving.

As the larger sub-carrier spacing is adopted, the slot duration is correspondingly reduced, and the original effect of energy saving gradually fails to meet application requirements, and thus improvement is required.

SUMMARY

In a first aspect, embodiments of the present disclosure provide a method for transmitting scheduling interval information, the method being performed by a network device or by a chip in the network device. The network device may include an access network device, such as a base station and a node B. The method includes: sending a high-layer signaling to a user equipment, the high-layer signaling including information for indicating a value range of a minimum scheduling interval, and a maximum value of the value range of the minimum scheduling interval being greater than 16.

In a second aspect, embodiments of the present disclosure provides a method for transmitting scheduling interval information, the method being performed by a user equipment, or by a chip in the user equipment. The user equipment may be a mobile phone. The method includes: receiving a high-layer signaling from a network device, the high-layer signaling including information for indicating a value range of a minimum scheduling interval, and a maximum value of the value range of the minimum scheduling interval being greater than 16.

In a third aspect, the present disclosure provides a network device including a processor and a memory. The memory is configured to store a computer program, and the processor is configured to execute the computer program to implement the first aspect or any one of the possible designs of the first aspect.

In a fourth aspect, the present disclosure provides a user equipment including a processor and a memory. The memory is configured to store a computer program, and the processor is configured to execute the computer program to implement the second aspect or any one of the possible designs of the second aspect.

In a fifth aspect, the present disclosure provides a non-transitory computer-readable storage medium having stored therein instructions (or computer programs, programs) that, when invoked and executed by a computer, cause the computer to perform the first aspect or any one of the possible designs of the first aspect described above.

In a sixth aspect, the present disclosure provides a non-transitory computer-readable storage medium having stored therein instructions (or computer programs, programs) that, when invoked and executed by a computer, cause the computer to perform the second aspect or any one of the possible designs of the second aspect described above.

BRIEF DESCRIPTION OF THE DRAWINGS

The accompanying drawings provided herein are described for better understanding of embodiments of the present disclosure, and constitute a part of the specification. The accompanying drawings are used to explain the present disclosure together with the embodiments of the present disclosure, and do not constitute a limitation for the present disclosure, in which:

The accompanying drawings, which are incorporated in and constitute a part of this specification, illustrate embodiments in line with the present disclosure and, together with the description, serve to explain principles of the present disclosure.

FIG. 1 is a schematic diagram illustrating a wireless communication system architecture provided by embodiments of the present disclosure:

FIG. 2 is a flow chart of a method for transmitting scheduling interval information according to an embodiment:

DETAILED DESCRIPTION

Figure 3:
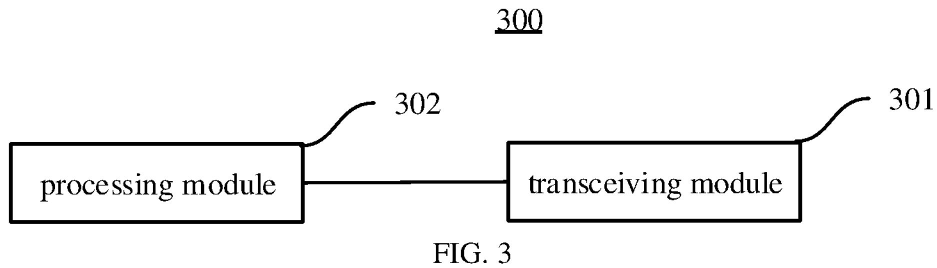
FIG. 3 is a schematic diagram illustrating a device for transmitting scheduling interval information according to an embodiment.

Embodiments of the present disclosure will now be further described with reference to the accompanying drawings and detailed description.

Reference will now be made in detail to embodiments, examples of which are illustrated in the accompanying drawings. The following description refers to the accompanying drawings in which the same reference numerals in different drawings represent the same or similar elements unless otherwise represented. The implementations set forth in the following description of embodiments do not represent all implementations in line with the present disclosure. Instead, they are merely examples of devices and methods in line with aspects related to the present disclosure as recited in the appended claims.

As shown in FIG. 1, a method for transmitting scheduling interval information provided by embodiments of the present disclosure may be applied to a wireless communication system 100, which may include a terminal device 101 and a network device 102. The terminal device 101 is configured to support carrier aggregation, and the terminal device 101 may be connected to multiple carrier units of the network device 102, the multiple carrier units including one primary carrier unit and one or more secondary carrier units.

It should be understood that the wireless communication system 100 may be applicable to both low frequency and high frequency scenarios. Application scenarios of the wireless communication system 100 include, but are not limited to, a long term evolution (LTE) system, an LTE frequency division duplex (FDD) system, an LTE time division duplex (TDD) system, a worldwide interoperability for microwave access (WiMAX) communication system, a cloud wireless access network (CRAN) system, a future 5th-generation (5G) system, a new radio (NR) communication system or a future evolution public land mobile network (PLMN) system, etc.

The terminal device 101 shown above may be a user equipment (UE), a terminal, an access terminal, a terminal unit, a terminal station, a mobile station (MS), a remote station, a remote terminal, a mobile terminal, a wireless communication device, a terminal agent or terminal means. The terminal device 101 may has a wireless transceiving function, and is capable of communicating (e.g., wirelessly communicating) with one or more network devices of one or more communication systems, and accepting network service(s) provided by the network device(s) including but not limited to the illustrated network device 102.

The terminal device 101 may be a cellular phone, a cordless phone, a session initiation protocol (SIP) phone, a wireless local loop (WLL) station, a personal digital assistant (PDA) device, a handheld device with a wireless communication capability, a computing device or other processing device connected to a wireless modem, an in-vehicle device, a wearable device, a terminal device in a future 5G network or a terminal device in a future evolution PLMN network.

The network device 102 may be an access network device (or called an access network site). The access network device refers to a device providing a network access function, such as a radio access network (RAN) base station. The network device 102 may specifically include a base station (BS), or include the base station and a radio resource management device configured to control the base station. The network device 102 may further include a relay station (a relay device), an access point, and a base station in the future 5G network, a base station in the future evolution PLMN network, or an NR base station. The network device 102 may be a wearable device or an in-vehicle device. The network device 102 may also be a communication chip with a communication module.

For example, the network device 102 includes, but is not limited to, a next-generation base station (gnodeB, gNB) in 5G, an evolved node B (eNB) in the LTE system, a radio network controller (RNC), a node B (NB) in a wideband code division multiple access (WCDMA) system, a radio controller under the CRAN system, a base station controller (BSC), a base transceiver station (BTS) in a global system for mobile communications (GSM) or code division multiple access (CDMA) system, a home base station (for example, a home evolved nodeB, or a home node B (HNB)), a baseband unit (BBU), a transmitting and receiving point (TRP), a transmitting point (TP) or a mobile switching center.

Embodiments of the present disclosure provides the method for transmitting the scheduling interval information. Referring to FIG. 2, FIG. 2 is a flow chart of a method for transmitting scheduling interval information according to an embodiment. As shown in FIG. 2, the method includes the following steps.

In S21, the network device 102 sends a high-layer signaling to the user equipment 101, in which the high-layer signaling includes information for indicating a value range of a minimum scheduling interval, and a maximum value of the value range of the minimum scheduling interval is greater than 16.

In S22, the user equipment 101 receives the high-level signaling from the network device 102, in which the high-layer signaling includes the information for indicating the value range of the minimum scheduling interval, and the maximum value of the value range of the minimum scheduling interval is greater than 16.

In some embodiments, the maximum value of the value range of the minimum scheduling interval is 32.

In some embodiments, the maximum value of the value range of the minimum scheduling interval is 64.

In some embodiments, the maximum value of the value range of the minimum scheduling interval is 128.

In the embodiments of the present disclosure, the network device 102 sends the high-layer signaling to the user equipment 101. The high-layer signaling includes the information for indicating the value range of the minimum scheduling interval, and the maximum value of the value range of the minimum scheduling interval is greater than 16. The value range of the minimum scheduling interval is expanded compared with the value range of the minimum scheduling interval (which has the maximum value of 16) in the related art, and in the case where the adopted sub-carrier spacing is larger, the value of the minimum scheduling interval adopted is increased. The user equipment may perform various energy-saving operations within the minimum scheduling interval (for example, turning off some radio frequency devices, reducing the cache and the processing voltage), which may effectively improve the energy-saving effect for the user equipment.

Embodiments of the present disclosure provides a method for transmitting scheduling interval information. The method is performed by the network device 102, and includes sending the high-layer signaling to the user equipment 101, in which the high-layer signaling includes the information for indicating the value range of the minimum scheduling interval, and the maximum value of the value range of the minimum scheduling interval is greater than 16.

In some embodiments, the maximum value of the value range of the minimum scheduling interval is 32.

In some embodiments, the maximum value of the value range of the minimum scheduling interval is 64.

In some embodiments, the maximum value of the value range of the minimum scheduling interval is 128.

In the embodiments of the present disclosure, the network device 102 sends the high-layer signaling to the user equipment 101, in which the high-layer signaling includes the information for indicating the value range of the minimum scheduling interval, and the maximum value of the value range of the minimum scheduling interval is greater than 16. The value range of the minimum scheduling interval is expanded compared with the value range of the minimum scheduling interval (which has the maximum value of 16) in the related art, and in the case where the adopted sub-carrier spacing is higher, the value of the minimum scheduling interval adopted is increased. The user equipment may perform various energy-saving operations within the minimum scheduling interval (for example, turning off some radio frequency devices, reducing the cache and the processing voltage), which may effectively improve the energy-saving effect for the user equipment.

Embodiments of the present disclosure provides the method for transmitting the scheduling interval information. The method is performed by the network device 102, and includes sending the high-layer signaling to the user equipment 101, in which the high-layer signaling includes the information for indicating the value range of the minimum scheduling interval, and the maximum value of the value range of the minimum scheduling interval is greater than 16.

The value range of the minimum scheduling interval corresponds to any sub-carrier spacing.

In some embodiments, the maximum value of the value range of the minimum scheduling interval is 32.

In some embodiments, the maximum value of the value range of the minimum scheduling interval is 64.

In some embodiments, the maximum value of the value range of the minimum scheduling interval is 128.

In some embodiments, the value range of the minimum scheduling interval ranges from 0 to 32.

In some embodiments, the value range of the minimum scheduling interval ranges from 0 to 64.

In some embodiments, the value range of the minimum scheduling interval ranges from 0 to 128.

In some embodiments, the value range of the minimum scheduling interval ranges from 16 to 32.

In some embodiments, the value range of the minimum scheduling interval ranges from 32 to 64.

In some embodiments, the value range of the minimum scheduling interval ranges from 64 to 128.

In some embodiments, the value range of the minimum scheduling interval ranges from 16 to 64.

In some embodiments, the value range of the minimum scheduling interval ranges from 32 to 128.

In the embodiments of the present disclosure, the network device 102 indicates the value range of the minimum scheduling interval to the user equipment 101 through the high layer signaling, and the value range of the minimum scheduling interval corresponds to any sub-carrier spacing, that is, the value range of the minimum scheduling interval, which is learned by the user equipment 101, is applicable to any sub-carrier spacing.

Embodiments of the present disclosure provides the method for transmitting the scheduling interval information. The method is performed by the network device 102, and includes sending the high-layer signaling to the user equipment 101, in which the high-layer signaling includes the information for indicating the value range of the minimum scheduling interval, and the maximum value of the value range of the minimum scheduling interval is greater than 16.

The information for indicating the value range of the minimum scheduling interval includes a plurality of mapping relationships, and each mapping relationship includes a sub-carrier spacing and a value range of a minimum scheduling interval corresponding to the sub-carrier spacing.

In some embodiments, the value range of the minimum scheduling interval corresponding to the sub-carrier spacing between 15 KHz and 120 KHz ranges from 0 to 16. The value range of the corresponding minimum scheduling interval ranges from 0 to 32 in a case that the sub-carrier spacing is 240 KHz. The value range of the corresponding minimum scheduling interval ranges from 16 to 64 in a case that the sub-carrier spacing is 480 KHz. The value range of the corresponding minimum scheduling interval ranges from 32 to 128 in a case that the sub-carrier spacing is 960 KHz.

In some embodiments, the value range of the minimum scheduling interval corresponding to the sub-carrier spacing between 15 KHz and 120 KHz ranges from 0 to 16. The value range of the corresponding minimum scheduling interval ranges from 0 to 32 in a case that the sub-carrier spacing is 240 KHz. The value range of the corresponding minimum scheduling interval ranges from 0 to 128 in a case that the sub-carrier spacing is 480 KHz or 960 KHz.

In some embodiments, the value range of the minimum scheduling interval corresponding to the sub-carrier spacing between 15 KHz and 120 KHz ranges from 0 to 16. The value range of the minimum scheduling interval corresponding to the sub-carrier spacing between 240 KHz and 960 KHz ranges from 0 to 128.

In some embodiments, the value range of the minimum scheduling interval corresponding to the sub-carrier spacing between 15 KHz and 120 KHz ranges from 0 to 16. The value range of the minimum scheduling interval corresponding to the sub-carrier spacing between 240 KHz and 960 KHz ranges from 32 to 128.

In embodiments of the present disclosure, the network device 102 indicates the value ranges of the minimum scheduling intervals corresponding to different sub-carrier spacings to the user equipment 101 through the high layer signaling, and the user equipment 101 determines the corresponding value range of the minimum scheduling interval based on the sub-carrier spacing applicable thereto.

Embodiments of the present disclosure provides the method for transmitting the scheduling interval information. The method is performed by the network device 102, and includes sending the high-layer signaling to the user equipment 101, in which the high-layer signaling includes the information for indicating the value range of the minimum scheduling interval, and the maximum value of the value range of the minimum scheduling interval is greater than 16.

The information for indicating the value range of the minimum scheduling interval includes the plurality of mapping relationships, and each mapping relationship includes the sub-carrier spacing and the value range of the minimum scheduling interval corresponding to the sub-carrier spacing. The plurality of mapping relationships include at least two mapping relationships, and in the at least two mapping relationships, the sub-carrier spacing is greater than a set value, and the maximum value of the value range of the minimum scheduling interval is positively correlated with a corresponding sub-carrier spacing.

For example, the value range of the minimum scheduling interval corresponding to sub-carrier spacing between 15

KHz and 120 KHz ranges from 0 to 16. The value range of the corresponding minimum scheduling interval ranges from 16 to 32 in a case that the sub-carrier spacing is 480 KHz. The value range of the corresponding minimum scheduling interval ranges from 32 to 128 in a case that the sub-carrier spacing is 960 KHz.

Embodiments of the present disclosure provides the method for transmitting the scheduling interval information. The method is performed by the network device 102, and includes sending the high-layer signaling to the user equipment 101, in which the high-layer signaling includes the information for indicating the value range of the minimum scheduling interval, and the maximum value of the value range of the minimum scheduling interval is greater than 16.

The information for indicating the value range of the minimum scheduling interval includes the plurality of mapping relationships, and each mapping relationship includes the sub-carrier spacing and the value range of the minimum scheduling interval corresponding to the sub-carrier spacing.

The plurality of mapping relationships include at least two mapping relationships, and in the at least two mapping relationships, the sub-carrier spacing is greater than a set value, and the maximum value of the value range of the minimum scheduling interval is directly proportional to a corresponding sub-carrier spacing.

For example, the value range of the corresponding minimum scheduling interval ranges from 16 to 64 in a case that the sub-carrier spacing is 480 KHz. The value range of the corresponding minimum scheduling interval ranges from 32 to 128 in a case that the sub-carrier spacing is 960 KHz.

Embodiments of the present disclosure provides the method for transmitting the scheduling interval information. The method is performed by the network device 102, and includes sending the high-layer signaling to the user equipment 101, in which the high-layer signaling includes the information for indicating the value range of the minimum scheduling interval, and the maximum value of the value range of the minimum scheduling interval is greater than 16.

The information for indicating the value range of the minimum scheduling interval includes the plurality of mapping relationships, and each mapping relationship includes the sub-carrier spacing and the value range of the minimum scheduling interval corresponding to the sub-carrier spacing.

The plurality of mapping relationships include at least two mapping relationships, and in the at least two mapping relationships, the sub-carrier spacing is greater than the set value, and the maximum value of the value range of the minimum scheduling interval is positively correlated with or directly proportional to the corresponding sub-carrier spacing.

In the at least two mapping relationships, a minimum value of the value range of the minimum scheduling interval is positively correlated with the corresponding sub-carrier spacing.

For example, the corresponding value range of the minimum scheduling interval ranges from 16 to 32 in a case that the sub-carrier spacing is 480 KHz. The corresponding value range of the minimum scheduling interval ranges from 32 to 128 in a case that the sub-carrier spacing is 960 KHz.

Embodiments of the present disclosure provides the method for transmitting the scheduling interval information. The method is performed by the network device 102, and includes sending the high-layer signaling to the user equipment 101, in which the high-layer signaling includes the information for indicating the value range of the minimum scheduling interval, and the maximum value of the value range of the minimum scheduling interval is greater than 16.

The information for indicating the value range of the minimum scheduling interval includes the plurality of mapping relationships, and each mapping relationship includes the sub-carrier spacing and the value range of the minimum scheduling interval corresponding to the sub-carrier spacing.

The plurality of mapping relationships include the at least two mapping relationships, and in the at least two mapping relationships, the sub-carrier spacing is greater than the set value, and the maximum value of the value range of the minimum scheduling interval is positively correlated with or directly proportional to the corresponding sub-carrier spacing.

In the at least two mapping relationships, a minimum value of the value range of the minimum scheduling interval is directly proportional to the corresponding sub-carrier spacing.

For example, the corresponding value range of the minimum scheduling interval ranges from 16 to 64 in a case that the sub-carrier spacing is 480 KHz. The corresponding value range of the minimum scheduling interval ranges from 32 to 128 in a case that the sub-carrier spacing is 960 KHz.

Embodiments of the present disclosure provides the method for transmitting scheduling interval information. The method is performed by the network device 102, and includes sending the high-layer signaling to the user equipment 101, in which the high-layer signaling includes the information for indicating the value range of the minimum scheduling interval, and the maximum value of the value range of the minimum scheduling interval is greater than 16.

The information for indicating the value range of the minimum scheduling interval includes the plurality of mapping relationships, and each mapping relationship includes the sub-carrier spacing and the value range of the minimum scheduling interval corresponding to the sub-carrier spacing.

The plurality of mapping relationships include the at least two mapping relationships, and in the at least two mapping relationships, the sub-carrier spacing is greater than the set value, and the maximum value of the value range of the minimum scheduling interval is positively correlated with or directly proportional to the corresponding sub-carrier spacing.

Minimum values of the value ranges of the minimum scheduling intervals in the plurality of mapping relationships are the same.

For example, the minimum values of the value ranges of the minimum scheduling intervals in the plurality of mapping relationships are 0.

For example, the minimum values of the value ranges of the minimum scheduling intervals in the plurality of mapping relationships are 16.

Embodiments of the present disclosure provides the method for transmitting the scheduling interval information. The method is performed by the network device 102, and includes sending the high-layer signaling to the user equipment 101, in which the high-layer signaling includes the information for indicating the value range of the minimum scheduling interval, and the maximum value of the value range of the minimum scheduling interval is greater than 16.

The value range of the minimum scheduling interval includes at least one of a value range of a first minimum scheduling interval, and a value range of a second minimum scheduling interval. The first minimum scheduling interval includes a minimum interval in a time domain between a physical downlink control channel (PDCCH) and a physical downlink shared channel (PDSCH), and the second minimum scheduling interval includes a minimum interval in a time domain between the physical downlink control channel (PDCCH) and a physical uplink shared channel (PUSCH).

A value range of the first minimum scheduling interval is the same as a value range of the second minimum scheduling interval, or the value range of the first minimum scheduling interval is different from the value range of the second minimum scheduling interval.

Embodiments of the present disclosure provides a method for transmitting scheduling interval information. The method is performed by the user equipment 101, and includes receiving a high-layer signaling from a network device 102, in which the high-layer signaling includes information for indicating a value range of a minimum scheduling interval, and a maximum value of the value range of the minimum scheduling interval is greater than 16.

In some embodiments, the maximum value of the value range of the minimum scheduling interval is 32.

In some embodiments, the maximum value of the value range of the minimum scheduling interval is 64.

In some embodiments, the maximum value of the value range of the minimum scheduling interval is 128.

In some embodiments, the value range of the minimum scheduling interval ranges from 0 to 32.

In some embodiments, the value range of the minimum scheduling interval ranges from 0 to 64.

In some embodiments, the value range of the minimum scheduling interval ranges from 0 to 128.

In some embodiments, the value range of the minimum scheduling interval ranges from 16 to 32.

In some embodiments, the value range of the minimum scheduling interval ranges from 32 to 64.

In some embodiments, the value range of the minimum scheduling interval ranges from 64 to 128.

In some embodiments, the value range of the minimum scheduling interval ranges from 16 to 64.

In some embodiments, the value range of the minimum scheduling interval ranges from 32 to 128.

In the embodiments of the present disclosure, the user equipment 101 receives the high-layer signaling from the network device 102, the high-layer signaling includes the information for indicating the value range of the minimum scheduling interval, and the maximum value of the value range of the minimum scheduling interval is greater than 16. The value range of the minimum scheduling interval is expanded compared with the value range of the minimum scheduling interval (which has the maximum value of 16) in the related art, and in the case where the adopted sub-carrier spacing is larger, the value of the minimum scheduling interval adopted is increased. The user equipment may perform various energy-saving operations within the minimum scheduling interval (for example, turning off some radio frequency devices, reducing the cache and the processing voltage), which may effectively improve the energy-saving effect for the user equipment.

Embodiments of the present disclosure provides the method for transmitting scheduling interval information. The method is performed by the user equipment 101, and includes receiving the high-layer signaling from the network device 102, in which the high-layer signaling includes the information for indicating the value range of the minimum scheduling interval, and the maximum value of the value range of the minimum scheduling interval is greater than 16.

The value range of the minimum scheduling interval corresponds to any sub-carrier spacing.

Embodiments of the present disclosure provides the method for transmitting the scheduling interval information. The method is performed by the user equipment 101, and includes receiving the high-layer signaling from the network device 102, in which the high-layer signaling includes the information for indicating the value range of the minimum scheduling interval, and the maximum value of the value range of the minimum scheduling interval is greater than 16.

The information for indicating the value range of the minimum scheduling interval includes a plurality of mapping relationships, and each mapping relationship includes a sub-carrier spacing and a value range of a minimum scheduling interval corresponding to the sub-carrier spacing.

Embodiments of the present disclosure provides the method for transmitting the scheduling interval information. The method is performed by the user equipment 101, and includes receiving the high-layer signaling from the network device 102, in which the high-layer signaling includes the information for indicating the value range of the minimum scheduling interval, and the maximum value of the value range of the minimum scheduling interval is greater than 16.

The information for indicating the value range of the minimum scheduling interval includes the plurality of mapping relationships, and each mapping relationship includes the sub-carrier spacing and the value range of the minimum scheduling interval corresponding to the sub-carrier spacing.

The plurality of mapping relationships include at least two mapping relationships, and in the at least two mapping relationships, the sub-carrier spacing is greater than a set value, and the maximum value of the value range of the minimum scheduling interval is positively correlated with a corresponding sub-carrier spacing.

Embodiments of the present disclosure provides the method for transmitting the scheduling interval information. The method is performed by the user equipment 101, and includes receiving the high-layer signaling from the network device 102, in which the high-layer signaling includes the information for indicating the value range of the minimum scheduling interval, and the maximum value of the value range of the minimum scheduling interval is greater than 16.

The information for indicating the value range of the minimum scheduling interval includes the plurality of mapping relationships, and each mapping relationship includes the sub-carrier spacing and the value range of the minimum scheduling interval corresponding to the sub-carrier spacing.

The plurality of mapping relationships include the at least two mapping relationships, and in the at least two mapping relationships, the sub-carrier spacing is greater than the set value, and the maximum value of the value range of the minimum scheduling interval is directly proportional to the corresponding sub-carrier spacing.

Embodiments of the present disclosure provides the method for transmitting the scheduling interval information. The method is performed by the user equipment 101, and includes receiving the high-layer signaling from the network device 102, in which the high-layer signaling includes the information for indicating the value range of the minimum scheduling interval, and the maximum value of the value range of the minimum scheduling interval is greater than 16.

The information for indicating the value range of the minimum scheduling interval includes the plurality of mapping relationships, and each mapping relationship includes the sub-carrier spacing and the value range of the minimum scheduling interval corresponding to the sub-carrier spacing.

The plurality of mapping relationships include at least two mapping relationships, and in the at least two mapping relationships, the sub-carrier spacing is greater than the set value, and the maximum value of the value range of the minimum scheduling interval is positively correlated with or directly proportional to the corresponding sub-carrier spacing.

In the at least two mapping relationships, a minimum value of the value range of the minimum scheduling interval is positively correlated with the corresponding sub-carrier spacing.

Embodiments of the present disclosure provides the method for transmitting the scheduling interval information. The method is performed by the user equipment 101, and includes receiving the high-layer signaling from the network device 102, in which the high-layer signaling includes the information for indicating the value range of the minimum scheduling interval, and the maximum value of the value range of the minimum scheduling interval is greater than 16.

The information for indicating the value range of the minimum scheduling interval includes the plurality of mapping relationships, and each mapping relationship includes the sub-carrier spacing and the value range of the minimum scheduling interval corresponding to the sub-carrier spacing.

The plurality of mapping relationships include the at least two mapping relationships, and in the at least two mapping relationships, the sub-carrier spacing is greater than the set value, and the maximum value of the value range of the minimum scheduling interval is positively correlated with or directly proportional to the corresponding sub-carrier spacing.

In the at least two mapping relationships, a minimum value of the value range of the minimum scheduling interval is directly proportional to the corresponding sub-carrier spacing.

Embodiments of the present disclosure provides the method for transmitting the scheduling interval information. The method is performed by the user equipment 101, and includes receiving the high-layer signaling from the network device 102, in which the high-layer signaling includes the information for indicating the value range of the minimum scheduling interval, and the maximum value of the value range of the minimum scheduling interval is greater than 16.

The information for indicating the value range of the minimum scheduling interval includes the plurality of mapping relationships, and each mapping relationship includes the sub-carrier spacing and the value range of the minimum scheduling interval corresponding to the sub-carrier spacing.

The plurality of mapping relationships include the at least two mapping relationships, and in the at least two mapping relationships, the sub-carrier spacing is greater than the set value, and the maximum value of the value range of the minimum scheduling interval is positively correlated with or directly proportional to the corresponding sub-carrier spacing.

Minimum values of the value ranges of the minimum scheduling intervals in the plurality of mapping relationships are the same.

Embodiments of the present disclosure provides the method for transmitting the scheduling interval information. The method is performed by the user equipment 101, and includes receiving the high-layer signaling from the network device 102, in which the high-layer signaling includes the information for indicating the value range of the minimum scheduling interval, and the maximum value of the value range of the minimum scheduling interval is greater than 16.

The value range of the minimum scheduling interval includes at least one of a value range of the first minimum scheduling interval, and a value range of the second minimum scheduling interval. The first minimum scheduling interval includes a minimum interval in a time domain between a physical downlink control channel (PDCCH) and a physical downlink shared channel (PDSCH), and the second minimum scheduling interval includes a minimum interval in a time domain spacing between the PDCCH and a physical uplink shared channel (PUSCH).

Embodiments of the present disclosure provides the method for transmitting the scheduling interval information. The method is performed by the user equipment 101, and includes receiving the high-layer signaling from the network device 102, in which the high-layer signaling includes the information for indicating the value range of the minimum scheduling interval, and the maximum value of the value range of the minimum scheduling interval is greater than 16.

A value range of the first minimum scheduling interval is the same as a value range of the second minimum scheduling interval, or the value range of the first minimum scheduling interval is different from the value range of the second minimum scheduling interval.

Based on the same concept as the above-described method embodiments, embodiments of the present disclosure further provide a communication device that has a function of the network device 102 in the above-described method embodiments and is configured to perform the steps performed by the network device 102 provided by the above-described method embodiments. The function may be implemented in a form of hardware, in a form of software or in a form of hardware executing corresponding software. The hardware or software includes one or more modules corresponding to the function described above.

In one possible implementation, FIG. 3 shows a communication device 300 which may be served as the network device involved in the above-described method embodiments and perform the steps performed by the network device in the above-described method embodiments. As shown in FIG. 3, the communication device 300 may include a transceiving module 301 and a processing module 302 coupled to each other. The transceiving module 301 may be configured to support the communication device 300 to perform communication, and the transceiving module 301 may have a wireless communication function, for example, the transceiving module 301 may perform wireless communication with other communication devices through a wireless radio. The processing module 302 may be configured to support the communication device 300 to perform processing operations in the above-described method embodiments, including, but not limited to, generating information and a messages to be transmitted by the transceiving module 301, and/or demodulating and decoding signals received by the transceiving module 301.

The transceiving module 301 is configured to send the high-layer signaling to the user equipment when performing the steps implemented by the network device 102. The high-layer signaling includes the information for indicating the value range of the minimum scheduling interval, and the maximum value of the value range of the minimum scheduling interval is greater than 16.

The value range of the minimum scheduling interval corresponds to any sub-carrier spacing.

In some embodiments, the information for indicating the value range of the minimum scheduling interval includes a plurality of mapping relationships, and each mapping relationship includes a sub-carrier spacing and a value range of a minimum scheduling interval corresponding to the sub-carrier spacing.

In some embodiments, the plurality of mapping relationships include at least two mapping relationships, and in the at least two mapping relationships, the sub-carrier spacing is greater than a set value, and the maximum value of the value range of the minimum scheduling interval is positively correlated with a corresponding sub-carrier spacing.

In some embodiments, the plurality of mapping relationships include at least two mapping relationships, and in the at least two mapping relationships, the sub-carrier spacing is greater than a set value, and the maximum value of the value range of the minimum scheduling interval is directly proportional to a corresponding sub-carrier spacing.

In some embodiments, in the at least two mapping relationships, a minimum value of the value range of the minimum scheduling interval is positively correlated with the corresponding sub-carrier spacing.

In some embodiments, in the at least two mapping relationships, a minimum value of the value range of the minimum scheduling interval is directly proportional to the corresponding sub-carrier spacing.

In some embodiments, in the plurality of mapping relationships, minimum values of the value ranges of the minimum scheduling intervals are the same.

In some embodiments, the value range of the minimum scheduling interval includes at least one of: a value range of a first minimum scheduling interval, and a value range of a second minimum scheduling interval. The first minimum scheduling interval includes a minimum interval in a time domain between a physical downlink control channel (PDCCH) and a physical downlink shared channel (PDSCH), and the second minimum scheduling interval includes a minimum interval in a time domain between the PDCCH and a physical uplink shared channel (PUSCH).

In some embodiments, a value range of the first minimum scheduling interval is the same as a value range of the second minimum scheduling interval, or the value range of the first minimum scheduling interval is different from the value range of the second minimum scheduling interval.

Figure 4:
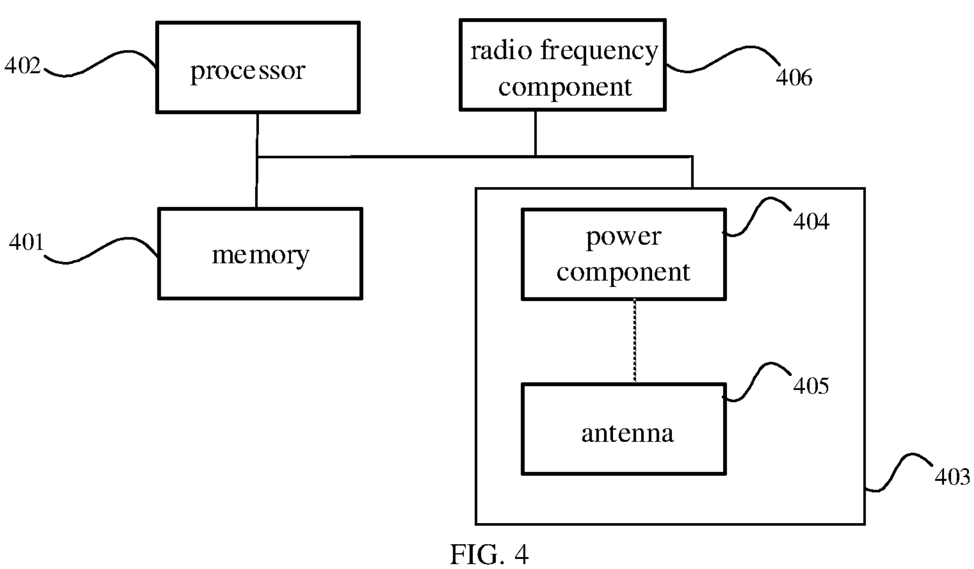
FIG. 4 is a schematic diagram illustrating a device for transmitting scheduling interval information according to another embodiment.

In the case that the communication device is the network device 102, it is also possible for the device to have a structure as shown in FIG. 4. The structure of the communication device is illustrated with a base station as an example. As shown in FIG. 4, the device 400 includes a memory 401, a processor 402, a transceiving component 403, and a power component 406. The memory 401 is coupled to the processor 402 and may be configured to store programs and data necessary for the communication device 400 to perform various functions. The processor 402 is configured to support the communication device 400 to perform the corresponding functions in the above method, which may be implemented by invoking the program stored in the memory 401. The transceiving component 403 may be a wireless transceiver configured to support the communication device 400 to receive signaling and/or data and transmit the signaling and/or data through the wireless radio. The transceiving component 403, which may also be referred to as a transceiving unit or a communication unit, may include a radio frequency component 404, which may be a remote radio unit radio (RRU), in particular for transmission of a radio frequency signal and conversion of the radio frequency signal to a baseband signal, and one or more antennas 405, in particular for radiation and reception of the radio frequency signal.

In a case that the communication device 400 needs to send data, the processor 402 may perform baseband processing on the data to be sent, and output a baseband signal to a radio frequency unit. In a case that the data is sent to the communication device 400, the radio frequency unit receives the radio frequency signal through the antenna, converts the radio frequency signal into the baseband signal, and outputs the baseband signal to the processor 402. The processor 402 converts the baseband signal to data and processes the data.

Based on the same concept as the above-described method embodiments, embodiments of the present disclosure further provide a communication device that may have a function of the user equipment 101 in the above-described method embodiments and may be configured to perform the steps performed by the user equipment 101 provided by the above-described method embodiments. The function may be implemented in a form of hardware, in a form of software or in the form of hardware executing corresponding software. The hardware or software includes one or more modules corresponding to the function described above.

Figure 5:
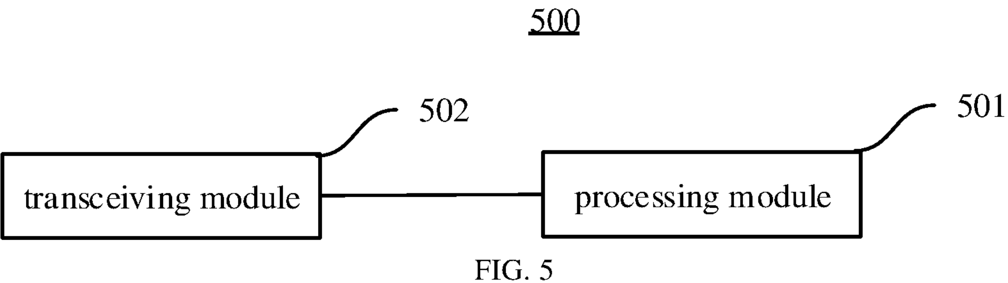
FIG. 5 is a schematic diagram illustrating a device for transmitting scheduling interval information according to a further embodiment.

In one possible implementation, FIG. 5 shows a communication device 500 which may be served as the user equipment involved in the above-described method embodiments and perform the steps performed by the user equipment in the above-described method embodiments. As shown in FIG. 5, the communication device 500 may include a transceiving module 501 and a processing module 502 coupled to each other. The transceiving module 501 may be configured to support the communication device 500 to perform communication, and the transceiving module 501 may have a wireless communication function, for example, the transceiving module 501 may perform wireless communication with other communication devices through a wireless radio. The processing module 502 may be configured to support the communication device 500 to perform processing operations in the above-described method embodiments, including, but not limited to, generating information and messages to be transmitted by the transceiving module 501, and/or demodulating and decoding signals received by the transceiving module 501.

The transceiving module 501 is configured to receive a high-layer signaling from a network device when performing the steps implemented by the user equipment 101. The high-layer signaling includes information for indicating a value range of a minimum scheduling interval, and a maximum value of the value range of the minimum scheduling interval is greater than 16.

In some embodiments, the value range of the minimum scheduling interval corresponds to any sub-carrier spacing.

In some embodiments, the information for indicating the value range of the minimum scheduling interval includes a plurality of mapping relationships, and the mapping relationship includes a sub-carrier spacing and a value range of a minimum scheduling interval corresponding to the sub-carrier spacing.

In some embodiments, the plurality of mapping relationships include at least two mapping relationships, and in the at least two mapping relationships, the sub-carrier spacing is greater than a set value, and the maximum value of the value range of the minimum scheduling interval is positively correlated with a corresponding sub-carrier spacing.

In some embodiments, the plurality of mapping relationships include at least two mapping relationships, and in the at least two mapping relationships, the sub-carrier spacing is greater than a set value, and the maximum value of the value range of the minimum scheduling interval is directly proportional to a corresponding sub-carrier spacing.

In some embodiments, in the at least two mapping relationships, a minimum value of the value range of the minimum scheduling interval is positively correlated with the corresponding sub-carrier spacing.

In some embodiments, in the at least two mapping relationships, a minimum value of the value range of the minimum scheduling interval is directly proportional to the corresponding sub-carrier spacing.

In some embodiments, in the plurality of mapping relationships, minimum values of the value ranges of the minimum scheduling intervals are the same.

In some embodiments, the value range of the minimum scheduling interval includes at least one of: a value range of a first minimum scheduling interval, and a value range of a second minimum scheduling interval. The first minimum scheduling interval includes a minimum interval in a time domain between a physical downlink control channel (PDCCH) and a physical downlink shared channel (PDSCH), and the second minimum scheduling interval includes a minimum interval in a time domain between the PDCCH and a physical uplink shared channel (PUSCH).

In some embodiments, a value range of the first minimum scheduling interval is the same as a value range of the second minimum scheduling interval, or the value range of the first minimum scheduling interval is different from the value range of the second minimum scheduling interval.

Figure 6:
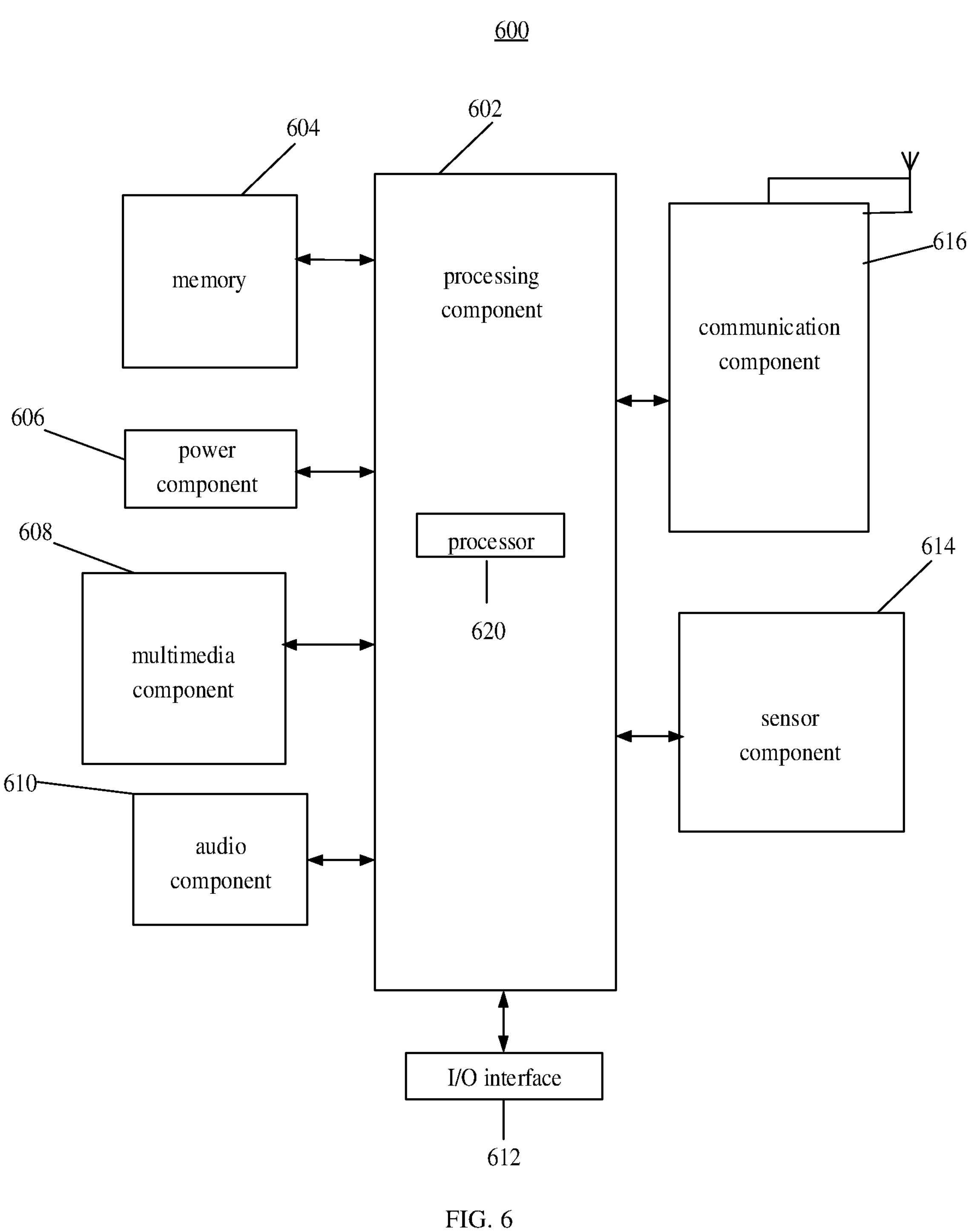
FIG. 6 is a schematic diagram illustrating a device for transmitting scheduling interval information according to a further embodiment.

In the case that the communication device is the user equipment 101, it is also possible for the device to have a structure as shown in FIG. 6. A device 600 shown in FIG. 6 may be a mobile phone, a computer, a digital broadcast terminal, a messaging device, a game console, a tablet device, a medical device, a fitness device, or a personal digital assistant.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, phone calls, data communications, camera operations, and recording operations. The processing component 602 can include one or more processors 620 to execute instructions to perform all or some of the steps in the above-described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, videos, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as keyboards, click wheels, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may further include a light sensor, such as a CMOS or CCD image sensor, for use in imaging applications. In some embodiments, the sensor component 614 may further include an accelerometer sensor, a gyroscope sensor, a magnetic sensor, a pressure sensor, or a temperature sensor.

The communication component 616 is configured to facilitate communication, wired or wireless, between the device 600 and other devices. The device 600 can access a wireless network based on a communication standard, such as Wi-Fi, 2G, or 3G, or a combination thereof. In an illustrative embodiment, the communication component 616 receives a broadcast signal or broadcast associated information from an external broadcast management system via a broadcast channel. In an illustrative embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an embodiment, there is also provided a non-transitory computer readable storage medium including instructions (such as the memory 604 including instructions) that, executable by the processor 620 in the device 600, cause the processor 620 to perform the above-mentioned method. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

INDUSTRIAL APPLICABILITY

The network device sends the high-layer signaling to the user equipment. The high-layer signaling includes the information for indicating the value range of the minimum scheduling interval, and the maximum value of the value range of the minimum scheduling interval is greater than 16. The value range of the minimum scheduling interval is expanded compared with the value range of the minimum scheduling interval (which has the maximum value of 16) in the related art, and in the case where the adopted sub-carrier spacing is larger, the value of the minimum scheduling interval adopted is increased. The user equipment may perform various energy-saving operations within the minimum scheduling interval (for example, turning off some radio frequency devices, reducing the cache and the processing voltage), which may effectively improve the energy-saving effect of the user equipment.

What is claimed is:

1. A method for transmitting scheduling interval information, performed by a network device, comprising:

sending a high-layer signaling to a user equipment, wherein the high-layer signaling comprises information indicating a value range of a minimum scheduling interval, wherein the value range of the minimum scheduling interval comprises at least one of:

a value range of a minimum interval in a time domain between a physical downlink control channel (PDCCH) and a physical downlink shared channel (PDSCH), or a value range of a minimum interval in a time domain between the PDCCH and a physical uplink shared channel (PUSCH); and a maximum value of the value range of the minimum scheduling interval is 64.

2. The method according to claim 1, wherein the value range of the minimum scheduling interval corresponds to a sub-carrier spacing.

3. The method according to claim 1, wherein the information indicating the value range of the minimum scheduling interval comprises a plurality of mapping relationships, and each mapping relationship comprises a sub-carrier spacing and a value range of a minimum scheduling interval corresponding to the sub-carrier spacing.

4. The method according to claim 3, wherein the plurality of mapping relationships comprise at least two mapping relationships, and in the at least two mapping relationships, the sub-carrier spacing is greater than a set value, and the maximum value of the value range of the minimum scheduling interval is positively correlated with, or directly proportional to, a corresponding sub-carrier spacing.

5. The method according to claim 4, wherein in the at least two mapping relationships, a minimum value of the value range of the minimum scheduling interval is positively correlated with, or directly proportional to, the corresponding sub-carrier spacing.

6. The method according to claim 4, wherein in the plurality of mapping relationships, minimum values of the value ranges of the minimum scheduling intervals are the same.

7. The method according to claim 1, wherein the value range of the minimum scheduling interval between the PDCCH and the PDSCH is the same as the value range of the minimum scheduling interval between the PDCCH and the PUSCH, or the value range of the minimum scheduling interval between the PDCCH and the PDSCH is different from the value range of the minimum scheduling interval between the PDCCH and the PUSCH.

8. A non-transitory computer-readable storage medium having stored therein instructions that, when executed by a processor of a network device, cause the network device to perform the method according to claim 1.

9. A method for transmitting scheduling interval information, performed by a user equipment, comprising:

receiving a high-layer signaling from a network device, wherein the high-layer signaling comprises information indicating a value range of a minimum scheduling interval, wherein the value range of the minimum scheduling interval comprises at least one of:

a value range of a minimum interval in a time domain between a physical downlink control channel (PDCCH) and a physical downlink shared channel (PDSCH), or a value range of a minimum interval in a time domain between the PDCCH and a physical uplink shared channel (PUSCH); and a maximum value of the value range of the minimum scheduling interval is 64.

10. The method according to claim 9, wherein the value range of the minimum scheduling interval corresponds to a sub-carrier spacing.

11. The method according to claim 9, wherein the information indicating the value range of the minimum scheduling interval comprises a plurality of mapping relationships, and each mapping relationship comprises a sub-carrier spacing and a value range of a minimum scheduling interval corresponding to the sub-carrier spacing.

12. The method according to claim 11, wherein the plurality of mapping relationships comprise at least two mapping relationships, and in the at least two mapping relationships, the sub-carrier spacing is greater than a set value, and the maximum value of the value range of the minimum scheduling interval is positively correlated with, or directly proportional to, a corresponding sub-carrier spacing.

13. The method according to claim 12, wherein in the at least two mapping relationships, a minimum value of the value range of the minimum scheduling interval is positively correlated with, or directly proportional to, the corresponding sub-carrier spacing.

14. The method according to claim 12, wherein in the plurality of mapping relationships, minimum values of the value ranges of the minimum scheduling intervals are the same.

15. The method according to claim 9, wherein the value range of the minimum scheduling interval between the PDCCH and the PDSCH is the same as the value range of the minimum scheduling interval between the PDCCH and the PUSCH, or the value range of the minimum scheduling interval between the PDCCH and the PDSCH is different from the value range of the minimum scheduling interval between the PDCCH and the PUSCH.

16. A user equipment, comprising:

a processor; and a memory storing a computer program;

wherein the processor is configured to perform the method according to claim 9.

17. A non-transitory computer-readable storage medium having stored therein instructions that, when executed by a processor of a user equipment, cause the user equipment to perform the method according to claim 9.

18. A network device, comprising:

a processor; and a memory storing a computer program;

wherein the processor is configured to:

send a high-layer signaling to a user equipment, wherein the high-layer signaling comprises information indicating a value range of a minimum scheduling interval, wherein the value range of the minimum scheduling interval comprises at least one of:

a value range of a minimum interval in a time domain between a physical downlink control channel (PDCCH) and a physical downlink shared channel (PDSCH), or a value range of a minimum interval in a time domain between the PDCCH and a physical uplink shared channel (PUSCH); and a maximum value of the value range of the minimum scheduling interval is 64.

* * * * *